United States Patent
Hong

(10) Patent No.: US 11,968,557 B2
(45) Date of Patent: Apr. 23, 2024

(54) MDT INFORMATION NOTIFYING METHOD AND MDT INFORMATION RECEIVING METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 17/636,861

(22) PCT Filed: Aug. 22, 2019

(86) PCT No.: PCT/CN2019/102087
§ 371 (c)(1),
(2) Date: Feb. 19, 2022

(87) PCT Pub. No.: WO2021/031213
PCT Pub. Date: Feb. 25, 2021

(65) Prior Publication Data
US 2022/0272560 A1 Aug. 25, 2022

(51) Int. Cl.
*H04W 4/60* (2018.01)
*H04W 8/20* (2009.01)
(Continued)

(52) U.S. Cl.
CPC ........... *H04W 24/10* (2013.01); *H04W 24/08* (2013.01); *H04W 88/06* (2013.01)

(58) Field of Classification Search
CPC ..... H04W 24/10; H04W 24/08; H04W 88/06; H04W 4/60; H04W 8/20; H04W 12/72; H04M 3/387
See application file for complete search history.

(56) References Cited

U.S. PATENT DOCUMENTS

| | | | |
|---|---|---|---|
| 9,100,858 B2 * | 8/2015 | Chang | H04W 76/27 |
| 2012/0083263 A1 * | 4/2012 | Kim | H04W 72/542 |
| | | | 455/423 |

(Continued)

FOREIGN PATENT DOCUMENTS

| | | |
|---|---|---|
| CN | 103582114 A | 2/2014 |
| CN | 106130618 A | 11/2016 |
| CN | 108476379 A | 8/2018 |

OTHER PUBLICATIONS

PCT/CN2019/102087 International Search Report dated May 21, 2020, 2 pages.

(Continued)

*Primary Examiner* — Andrew Wendell
(74) *Attorney, Agent, or Firm* — COZEN O'CONNOR

(57) ABSTRACT

The embodiments of the present disclosure relate to a method for notifying MDT information, including: performing MDT in a disconnected state by a first SIM card in the plurality of SIM cards to obtain MDT information; detecting whether a second SIM card in a connected state exists in the plurality of SIM cards after the first SIM card obtains the MDT information; sending request information to the second SIM card in response to the second SIM card existing, wherein, the request information is configured to request the second SIM card to notify a base station that the MDT information exists in the terminal; and sending, by the second SIM card, notification information to the base station, wherein the notification information is configured to notify the base station that the MDT information exists in the terminal.

17 Claims, 12 Drawing Sheets

(51) Int. Cl.
*H04W 24/08* (2009.01)
*H04W 24/10* (2009.01)
*H04W 88/06* (2009.01)

(56) References Cited

U.S. PATENT DOCUMENTS

| | | | | |
|---|---|---|---|---|
| 2014/0146732 | A1* | 5/2014 | Olufunmilola | H04L 5/0073 |
| | | | | 370/329 |
| 2014/0315577 | A1* | 10/2014 | Yokoyama | H04W 24/04 |
| | | | | 455/456.1 |
| 2015/0065106 | A1* | 3/2015 | Catovic | H04W 88/06 |
| | | | | 455/418 |
| 2018/0123707 | A1* | 5/2018 | Morishige | H04B 17/12 |
| 2018/0351665 | A1* | 12/2018 | Fukuta | H04W 16/18 |
| 2022/0104099 | A1* | 3/2022 | Yang | H04W 36/305 |
| 2023/0354009 | A1* | 11/2023 | Hong | H04W 8/183 |
| 2023/0362693 | A1* | 11/2023 | Hong | H04W 72/0446 |

OTHER PUBLICATIONS

Indian Patent Application No. 202247014337, Office Action dated Sep. 6, 2022, 6 pages.

\* cited by examiner

MDT INFORMATION NOTIFYING METHOD AND MDT INFORMATION RECEIVING METHOD

CROSS-REFERENCE TO RELATED APPLICATION

This application is a U.S. national phase of International Application No. PCT/CN2019/102087, filed on Aug. 22, 2019, the entire content of which is incorporated herein by reference.

TECHNICAL FIELD

The present disclosure relates to a field of communications, and particularly, to a method for notifying MDT information, a method for receiving MDT information, an apparatus for notifying MDT information, an apparatus for receiving MDT information, an electronic device, and a computer-readable storage medium.

BACKGROUND

In order to detect the performance of the network, the minimization of drive tests (MDT) technology is proposed in the related art. The network is measured through terminals such as mobile phones, and the measurement results are sent to the base station, so that the base station can obtain the related parameters of the network.

For a multi-card mobile phone, which is provided with multiple SIM cards, an international mobile equipment identity (IMEI) is respectively set for each SIM card in the related art. Based on different IMEIs, the base station regards different SIM cards as different terminals, and each SIM card independently exchanges data with the base station.

In some cases, a certain SIM card 1 in the mobile phone performs MDT and stores the MDT information, but the SIM card 1 is not in the connected state, while the SIM card 2 does not store the MDT information, but the SIM card 2 is in the connected state. Since each SIM card independently exchanges data with the base station, the base station cannot obtain the MDT information in the terminal in time.

SUMMARY

According to a first aspect of embodiments of the disclosure, a method for notifying MDT (minimization of drive tests) information is provided. The method is performed by a terminal with a plurality of SIM (subscriber identity module) cards. The method includes: performing MDT in a disconnected state by a first SIM card of the plurality of SIM cards to obtain MDT information; detecting, after the first SIM card obtains the MDT information, whether a second SIM card of the plurality of SIM cards being in a connected state; in response to a second SIM card being in a connected state, sending request information to the second SIM card, the request information being configured to request the second SIM card to notify a base station that the MDT information exists in the terminal; and sending, by the second SIM card, notification information to the base station, the notification information being configured to notify the base station that the MDT information exists in the terminal.

Optionally, the notification information is further configured to instruct a storage location of the MDT information in the terminal and/or a type of the MDT information.

Optionally, the storage location includes one of: the first SIM card, the second SIM card, a memory of the terminal.

Optionally, the method further includes: receiving first instruction information sent by the base station, the first instruction information being configured to instruct the first SIM card to send the MDT information to the base station; sending, by the first SIM card, a connection establishing request to the base station; and sending, by the first SIM card, the MDT information to the base station after the first SIM card establishes a connection with the base station.

Optionally, the method further includes: receiving second instruction information sent by the base station, the second instruction information being configured to instruct the second SIM card to send the MDT information to the base station; and sending, by the second SIM card, the MDT information to the base station.

Optionally, before the second SIM card sends the MDT information to the base station, the method further includes: sending, by the second SIM card, a request for obtaining the MDT information to the first SIM card; and receiving, by the second SIM card, the MDT information sent by the first SIM card.

Optionally, the request information carries the MDT information.

Optionally, the disconnected state is an idle state or an inactive state.

Optionally, sending the request information to the second SIM card includes: sending the request information to the second SIM card by the first SIM card.

Optionally, sending the request information to the second SIM card includes: sending the request information to the second SIM card by the terminal.

Optionally, the method further includes: in response to all the plurality of SIM cards being not in a connected state, detecting, before the first SIM card enters the connected state, whether a second SIM card of the plurality of SIM cards being in a connected state periodically.

According to a second aspect of embodiments of the disclosure, a method for receiving MDT information is provided. The method includes: receiving notification information sent by a second SIM card in a connected state of a plurality of SIM cards of a terminal, the notification information being configured to notify a base station that MDT information exists in the terminal; determining whether to receive the MDT information according to the notification information; sending instruction information to the terminal in response to determining to receive the MDT information, the instruction information being configured to instruct the terminal to send the MDT information to the base station; and receiving the MDT information sent by the terminal.

Optionally, the instruction information includes first instruction information, the first instruction information is configured to instruct a first SIM card in a disconnected state of the plurality of SIM cards of the terminal to send the MDT information to the base station. Receiving the MDT information sent by the terminal includes: receiving a connection establishing request sent by the first SIM card; establishing a connection with the first SIM card according to the connection establishing request; and receiving the MDT information sent by the first SIM card.

Optionally, the instruction information includes second instruction information, the second instruction information is configured to instruct the second SIM card to send the MDT information to the base station. Receiving the MDT information sent by the terminal includes: receiving the MDT information sent by the second SIM card.

Optionally, the notification information is further configured to instruct a storage location of the MDT information in the terminal and/or a type of the MDT information. Determining whether to receive the MDT information according to the notification information includes: determining whether to receive the MDT information according to the storage location of the MDT information in the terminal and/or the type of the MDT information.

Optionally, the storage location includes one of: the first SIM card, the second SIM card, a memory of the terminal.

According to a third aspect of embodiments of the disclosure, an apparatus for notifying MDT information is provided. The apparatus is performed by a terminal with a plurality of SIM (subscriber identity module) cards. The apparatus includes: an MDT module, configured to perform MDT in a disconnected state through a first SIM card of the plurality of SIM cards to obtain MDT information; a detecting module, configured to detect, after the first SIM card obtains the MDT information, whether a second SIM card of the plurality of SIM cards being in a connected state; a request sending module, configured to send, in response to a second SIM card being in a connected state, request information to the second SIM card in response to the second SIM card existing, the request information being configured to request the second SIM card to notify a base station that the MDT information exists in the terminal; and a notification module, configured to send notification information to the base station through the second SIM card, the notification information being configured to notify the base station that the MDT information exists in the terminal.

Optionally, the notification information is further configured to instruct a storage location of the MDT information in the terminal and/or a type of the MDT information.

Optionally, the storage location includes one of: the first SIM card, the second SIM card, a memory of the terminal.

Optionally, the apparatus further includes: a first receiving module, configured to receive first instruction information sent by the base station, the first instruction information being configured to instruct the first SIM card to send the MDT information to the base station; a connection establishing module, configured to send a connection establishing request to the base station through the first SIM card; and a first sending module, configured to send the MDT information to the base station through the first SIM card after the first SIM card establishes a connection with the base station.

Optionally, the apparatus further includes: a second receiving module, configured to receive second instruction information sent by the base station, the second instruction information being configured to instruct the second SIM card to send the MDT information to the base station; and a second sending module, configured to send the MDT information to the base station through the second SIM card.

Optionally, the apparatus further includes: a request obtaining module, configured to send a request for obtaining the MDT information to the first SIM card through the second SIM card; and an information receiving module, configured to receive the MDT information sent by the first SIM card through the second SIM card.

Optionally, the request information carries the MDT information.

Optionally, the disconnected state is an idle state or an inactive state.

Optionally, the request sending module is configured to send the request information to the second SIM card through the first SIM card.

Optionally, the request sending module is configured to send the request information to the second SIM card through the terminal.

Optionally, the detecting module is further configured to, in response to all the plurality of SIM cards being not in a connected state, detect, before the first SIM card enters the connected state, whether a second SIM card of the plurality of SIM cards being in a connected state periodically.

According to a fourth aspect of embodiments of the disclosure, an apparatus for receiving MDT information is provided. The apparatus includes: a notification receiving module, configured to receive notification information sent by a second SIM card in a connected state of a plurality of SIM cards of a terminal, the notification information being configured to notify a base station that MDT information exists in the terminal; a receive determining module, configured to determine whether to receive the MDT information according to the notification information; an instruction sending module, configured to send instruction information to the terminal in response to determining to receive the MDT information, the instruction information being configured to instruct the terminal to send the MDT information to the base station; and an information receiving module, configured to receive the MDT information sent by the terminal.

Optionally, the instruction information includes first instruction information, the first instruction information is configured to instruct a first SIM card in a disconnected state of the plurality of SIM cards of the terminal to send the MDT information to the base station. The information receiving module includes: a request receiving sub module, configured to receive a connection establishing request sent through the first SIM card; a connection establishing sub module, configured to establish a connection with the first SIM card according to the connection establishing request; and an information receiving sub module, configured to receive the MDT information sent by the first SIM card.

Optionally, the instruction information includes second instruction information, the second instruction information is configured to instruct the second SIM card to send the MDT information to the base station. The information receiving module is configured to receive the MDT information sent by the second SIM card.

Optionally, the notification information is further configured to instruct a storage location of the MDT information in the terminal and/or a type of the MDT information. The receive determining module is configured to determine whether to receive the MDT information according to the storage location of the MDT information in the terminal and/or the type of the MDT information.

Optionally, the storage location includes one of: the first SIM card, the second SIM card, a memory of the terminal.

According to a fifth aspect of embodiments of the disclosure, an electronic device is provided. The electronic device includes: a processor; and a memory configured to store instruction executable by the processor. The processor is configured to implement the method for notifying MDT information according to any of the above embodiments.

According to a sixth aspect of embodiments of the disclosure, an electronic device is provided. The electronic device includes: a processor; and a memory configured to store instruction executable by the processor. The processor is configured to implement the method for receiving MDT information according to any of the above embodiments.

According to a seventh aspect of embodiments of the disclosure, a computer-readable storage medium having stored thereon a computer program is provided. Steps of the method for notifying MDT information according to any of the above embodiments is implemented when the program is executed by a processor.

According to an eighth aspect of embodiments of the disclosure, a computer-readable storage medium having stored thereon a computer program is provided. Steps of the method for receiving MDT information according to any of the above embodiments is implemented when the program is executed by a processor.

BRIEF DESCRIPTION OF THE DRAWINGS

In order to explain the technical solutions in embodiments of the disclosure more clearly, the accompanying drawings to be used in the description of the embodiments will be briefly introduced below. Obviously, the accompanying drawings described below are only some embodiments of the present disclosure. Those skilled in the art may obtain other drawings from these drawings without creative work.

DETAILED DESCRIPTION

Embodiments of the disclosure are further described in combination with the accompanying drawings in order to make the purpose, the technical solution and advantages of the disclosure clearer. The technical solutions in the embodiments of the disclosure will be clearly and completely described below with reference to the accompanying drawings in the embodiments of the disclosure. Obviously, the described embodiments are only a part of the embodiments of the disclosure, rather than all the embodiments. Based on the embodiments in the disclosure, all other embodiments obtained by those skilled in the art without creative efforts shall fall within the protection scope of the disclosure.

Figure 1:
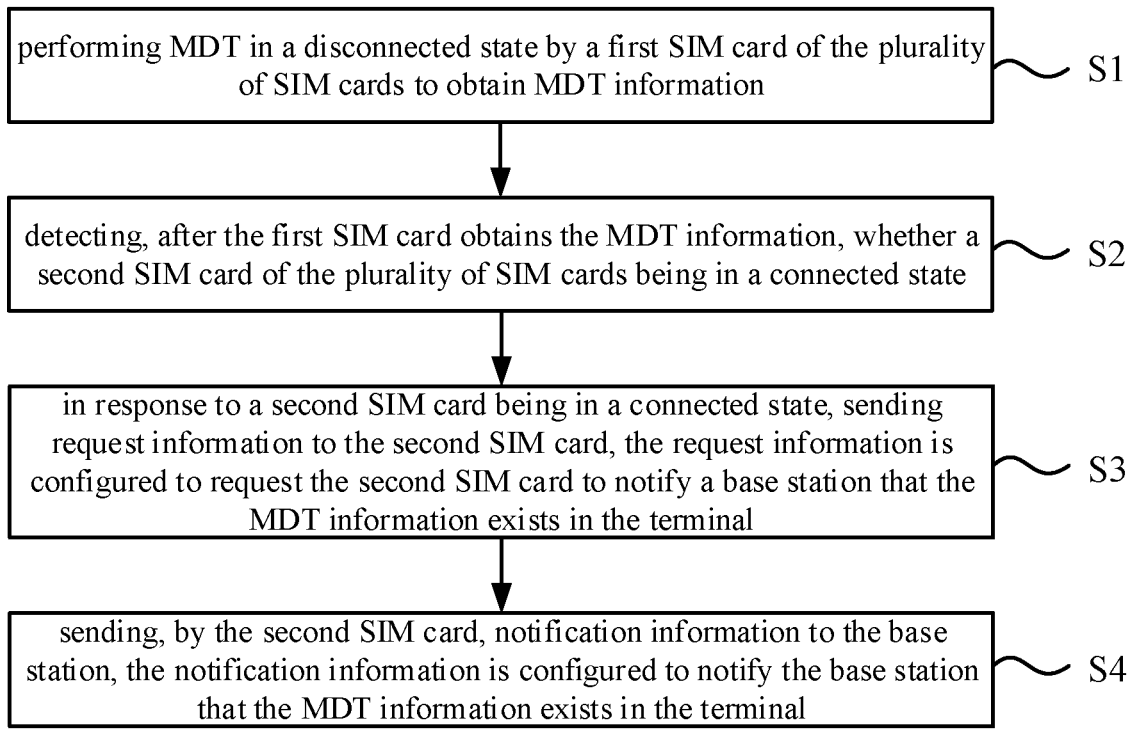
FIG. 1 is a flow chart illustrating a method for notifying MDT (minimization of drive tests) information according to an embodiment of the disclosure.

FIG. 1 is a flow chart illustrating a method for notifying MDT (minimization of drive tests) information according to an embodiment of the disclosure. The method for notifying MDT information illustrated in embodiments of the disclosure may be suited for a terminal. The terminal may be based on a multi-card single-standby (for example, dual-card single-standby) mode, or a multi-card multi-standby (for example, dual-card dual-standby) mode, or a multi-card multi-standby multi-pass (for example, dual-card dual-standby dual-pass) mode for communication.

The terminal can communicate with a base station as user equipment. For example, it can communicate with the base station based on 4G LTE (long term evolution), or can also communicate with the base station based on 5G NR (new radio). The terminal may be provided with a plurality of SIM (subscriber identity module) cards and may specifically be a USIM (universal subscriber identity module), and different SIM cards may correspond to different IMEIs (international mobile equipment identities).

As illustrated in FIG. 1, the method for notifying MDT may include the following steps S1 to S4.

At block S1, a first SIM card in the plurality of SIM cards performs MDT in a disconnected state to obtain MDT information.

In an embodiment, the disconnected state may be an idle state or an inactive state. The first SIM card may perform MDT in a disconnected state according to the configuration of the base station. For example, MDT may be performed periodically according to a configured period, or MDT may be performed in a specific cell according to a configured cell.

At block S2, it is detected whether a second SIM card in a connected state exists the plurality of SIM cards after the first SIM card obtains the MDT information.

In an embodiment, the second SIM card in the connected state means that there is an RRC (radio resource control layer) connection between the second SIM card and the base station.

At block S3, request information is sent to the second SIM card when the second SIM card exists, the request information is configured to request the second SIM card to notify the base station that the MDT information exists in the terminal.

At block S4, the second SIM card sends notification information to the base station, the notification information is configured to notify the base station that the MDT information exists in the terminal. The notification information may be RRC signaling, PUCCH (physical uplink control channel) signaling, or MAC CE (medium access control layer control element) signaling.

In an embodiment, the terminal may perform MDT through different SIM cards, respectively. The operation of the terminal performing MDT through the SIM card may be initiated by OAM (operation administration and maintenance). For example, the OAM may specify a SIM card in a terminal in a specific TA (track area) or cell to perform the MDT, or the OAM specifies a SIM card corresponding to a specific IMEI or IMSI (international mobile subscriber identification number) to perform the MDT.

In embodiments of the disclosure, the first SIM card in the multiple SIM cards performs MDT in the disconnected state, and after obtaining the MDT information, since the first SIM card is not in the connected state, the first SIM card cannot send information to the base station. In other words, the MDT information cannot be sent to the base station or the base station cannot be notified that the MDT information exists in the terminal.

Then it can be detected whether there is the second SIM card in the connected state (the second SIM card is not a special SIM card, but may be any second SIM card in the connected state) among the multiple SIM cards of the terminal. In the case that the second SIM card exists, since the second SIM card is in the connected state, the MDT information can be sent to the base station. Therefore, the request information can be sent to the second SIM card to request the second SIM card to notify the base station of the existence of MDT information in the terminal, and then the second SIM card can send notification information to the base station to notify the base station of the existence of MDT information in the terminal.

Accordingly, when the first SIM card that has obtains the MDT information cannot send the MDT information to the base station or notify the base station that MDT information exists in the terminal, the second SIM card in the connected state in the terminal can notify the base station to that the MDT information exists in the terminal, so that the base station can learn that the MDT information exists in the terminal in time, so that the base station can obtain the MDT information in the terminal in time as required.

It should be noted that, there may be multiple second SIM cards in the connected state in the terminal, so the first SIM card may detect multiple second SIM cards. In this case, the first SIM card may further detect the configured time domain resources of each second SIM card, and request information is sent to a second SIM card with the most advanced time domain resource, so that the second SIM card can send the notification information to the base station as soon as possible.

Optionally, the notification information is further configured to instruct a storage location of the MDT information in the terminal and/or a type of the MDT information.

In an embodiment, the first SIM card can carry the type of MDT information in the request information, such as, whether the MDT information is a logged MDT or an immediate MDT. The second SIM card may send the type of MDT information to the base station together in the notification information.

The MDT information may be stored in the first SIM card and may be transferred into a memory of the terminal after the first SIM card obtains the MDT information. The MDT information may also be carried in the request information by the first SIM card and sent to the second SIM card for storage. Therefore, the storage location of the MDT information in the terminal may be the first SIM card, the second SIM card, or the memory of the terminal.

By sending the storage location of the MDT information in the terminal and the type of the MDT information to the base station, it is convenient for the base station to determine whether to receive the MDT information. For example, the base station can determine whether the type of the MDT information is a target type. If the type of the MDT information is not the target type, the base station does not receive the MDT information. If the type of the MDT information is the target type, the base station receives the MDT information. For example, the base station may determine whether the storage location of the MDT information is a target SIM card. If it is not the target SIM card, the base station does not receive the MDT information. If it is the target SIM card, the base station receives MDT information.

Optionally, the storage location includes one of: the first SIM card, the second SIM card, a memory of the terminal.

Figure 2:
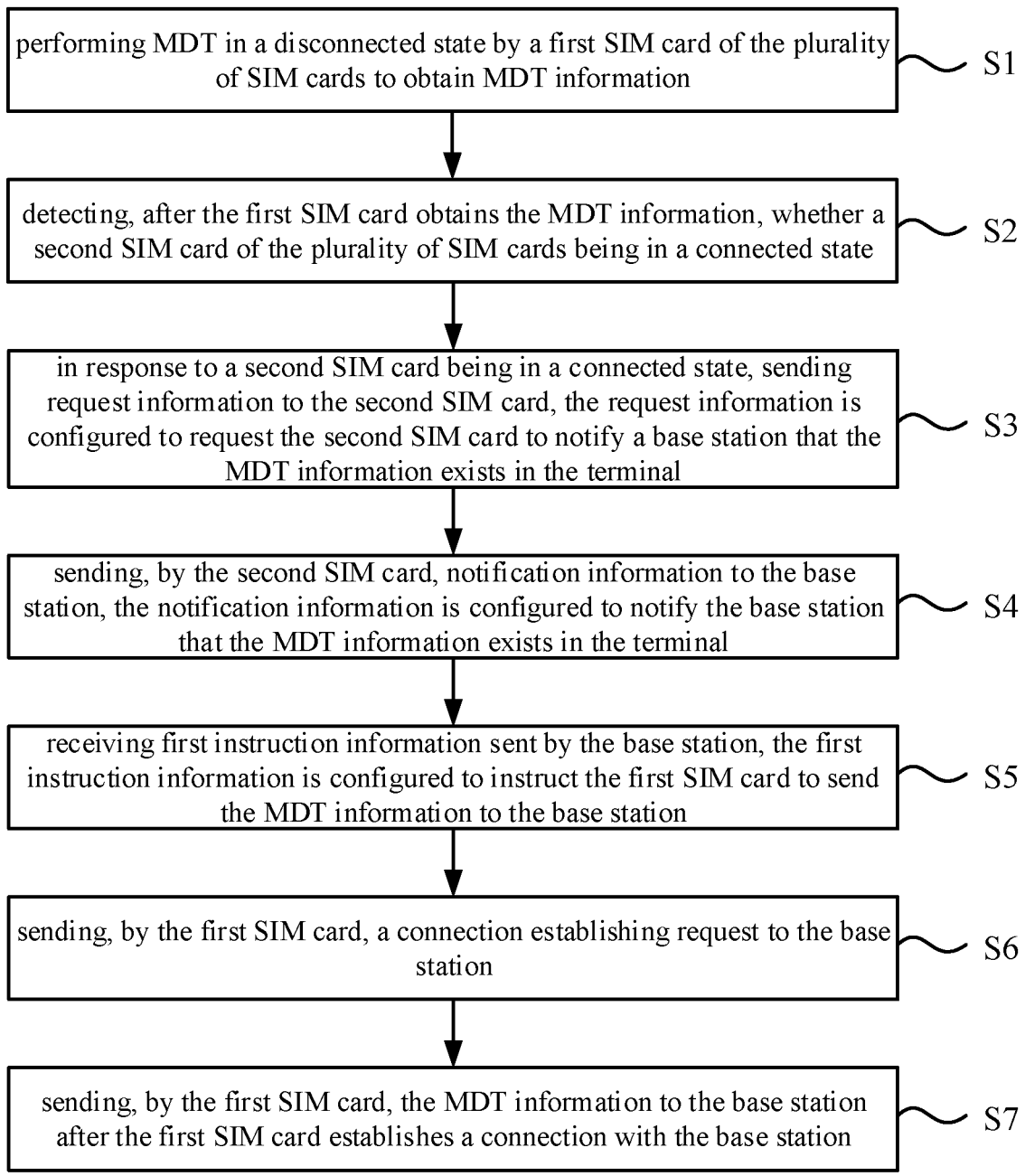
FIG. 2 is a flow chart illustrating a method for notifying MDT information according to another embodiment of the disclosure.

FIG. 2 is a flow chart illustrating a method for notifying MDT information according to another embodiment of the disclosure. As illustrated in FIG. 2, the method further includes the following S5 to S7.

At block S5, first instruction information sent by the base station is received, the first instruction information is configured to instruct the first SIM card to send the MDT information to the base station.

At block S6, the first SIM card sends a connection establishing request to the base station.

At block S7, the first SIM card sends the MDT information to the base station after the first SIM card establishes a connection with the base station.

In an embodiment, if the base station determines to receive the MDT information, the first instruction information may be sent to the terminal. The first instruction information instructs the terminal to send the MDT information to the base station through the first SIM card. After the terminal receives (for example, through the second SIM card) the first instruction information, it can be determined that the base station needs to receive the MDT information, and the first SIM card in the terminal can send a connection establishing request to the base station. After the first SIM card establishes a connection with the base station, the MDT information may be sent to the base station.

It should be noted that, for the different states of the first SIM card, the meaning of the connection establishing request may be different.

Figure 3:
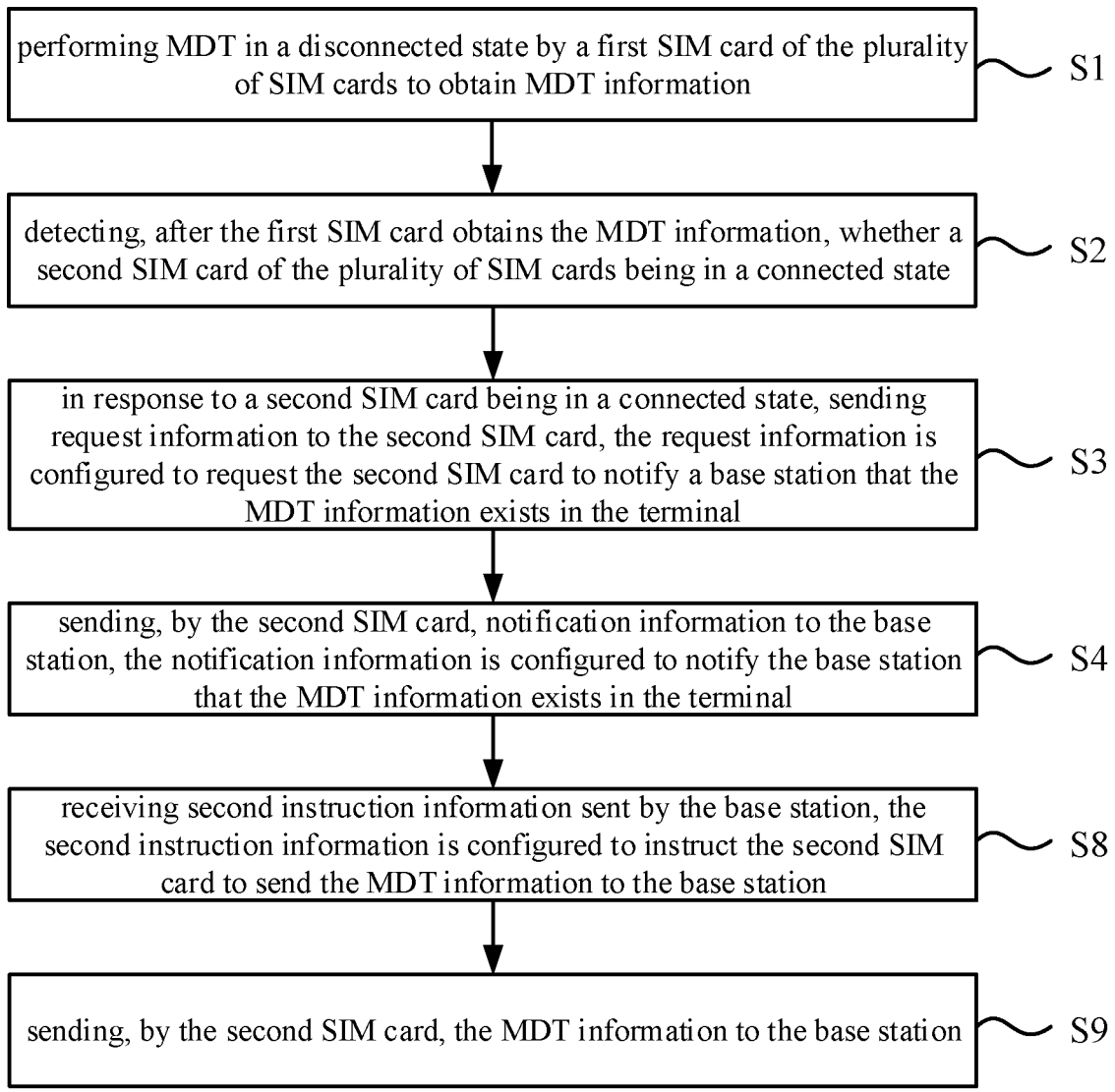
FIG. 3 is a flow chart illustrating a method for notifying MDT information according to yet another embodiment of the disclosure.

FIG. 3 is a flow chart illustrating a method for notifying MDT information according to yet another embodiment of the disclosure. As illustrated in FIG. 3, the method further includes the following S8 and S9.

At block S8, second instruction information sent by the base station is received, the second instruction information is configured to instruct the second SIM card to send the MDT information to the base station.

At block S9, the second SIM card sends the MDT information to the base station.

In an embodiment, if the base station determines to receive the MDT information, the second instruction information may be sent to the terminal. The second instruction information instructs the terminal to send the MDT information to the base station through the second SIM card. After the terminal receives (for example, through the second SIM card) the second instruction information, it can be determined that the base station needs to receive the MDT information. Since the second SIM card in the terminal is in a connected state, the MDT information may be directly sent to the base station.

Figure 4:
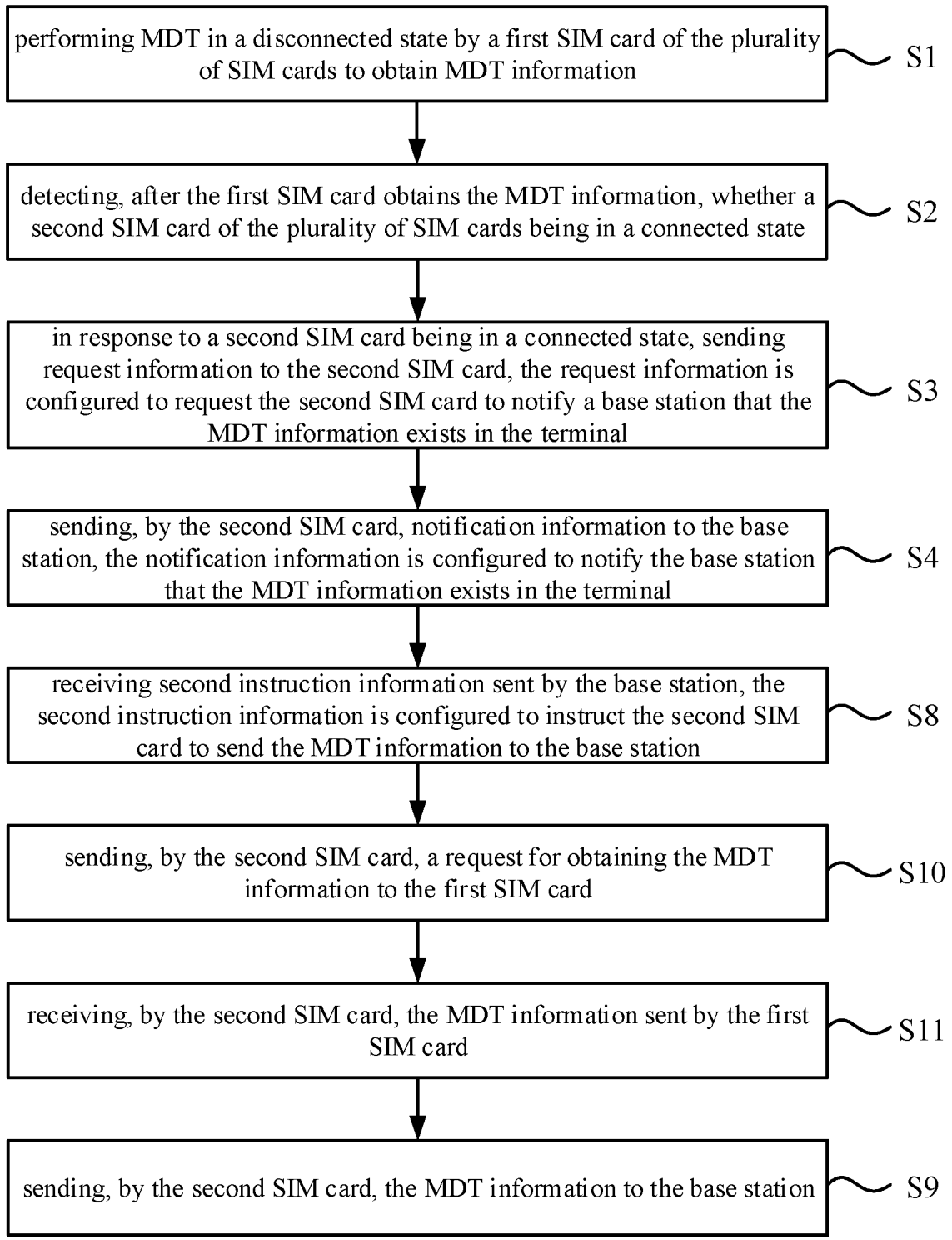
FIG. 4 is a flow chart illustrating a method for notifying MDT information according to yet another embodiment of the disclosure.

FIG. 4 is a flow chart illustrating a method for notifying MDT information according to yet another embodiment of the disclosure. As illustrated in FIG. 4, before the second SIM card sends the MDT information to the base station, the method further includes the following S10 and S11.

At block S10, the second SIM card sends a request for obtaining the MDT information to the first SIM card.

At block S11, the second SIM card receives the MDT information sent by the first SIM card.

In an embodiment, the first SIM card may store the MDT information after obtaining the MDT information. The second SIM card may send the request for obtaining the MDT information to the first SIM card in order to send the MDT information, so that the first SIM card sends the MDT information to the second SIM card. Then the second SIM card may send the MDT information to the base station after obtaining the MDT information.

Optionally, the request information carries the MDT information.

In an embodiment, when the first SIM card sends the request information to the second SIM card, the MDT information may be carried in the request information, so that there is MDT information in the second SIM card. Thus, when the second SIM card needs to send the MDT information to the base station, there is no need to request the first SIM card to send the MDT information, which is convenient to sending the MDT information to the base station as soon as possible.

Optionally, the disconnected state is an idle state or an inactive state.

In an embodiment, sending the request information to the second SIM card includes the following S301.

At block S301, the first SIM card sends the request information to the second SIM card.

In an embodiment, sending the request information to the second SIM card includes the following S302.

At block S302, the terminal sends the request information to the second SIM card.

In an embodiment, the action of sending the request information to the second SIM card may be performed by the first SIM card or may be performed by the terminal itself.

That the terminal itself sends the request information to the second SIM card may be implemented in the following two ways: the first SIM card first sends a request to the terminal, to request the terminal to send the request information to the second SIM card, and then the terminal sends the request information to the second SIM card; the first SIM card sends the obtained MDT information to the terminal, which is stored in the memory of the terminal, and when the terminal detects that there is MDT information stored in its memory, the terminal can send the request information to the second SIM card.

Figure 5:
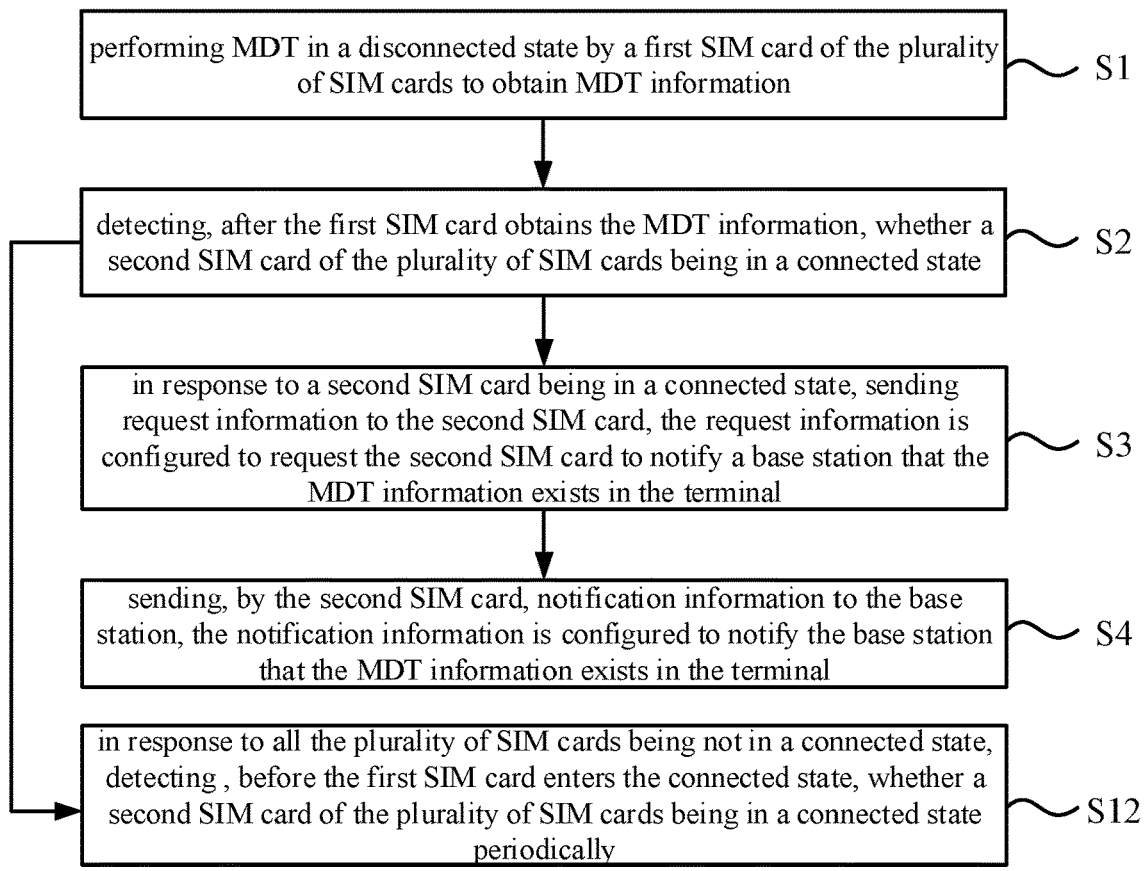
FIG. 5 is a flow chart illustrating a method for notifying MDT information according to yet another embodiment of the disclosure.

FIG. 5 is a flow chart illustrating a method for notifying MDT information according to yet another embodiment of the disclosure. As illustrated in FIG. 5, the method further includes the following S12.

At block S12, in response to the second SIM card not existing, it is periodically detected whether the second SIM card exists before the first SIM card enters the connected state.

In an embodiment, when the first SIM card detects that there is no second SIM card in the connected state, the first SIM card can periodically detect whether there is the second SIM before entering the connected state, so that the second SIM card can be detected when the first SIM card is in the disconnected state, and the base station is notified that there is the MDT information in the terminal through the second SIM card. Thus, when the first SIM card is in the disconnected state and cannot send the MDT information to the base station or cannot notify the based station that there is MDT information in the terminal, the base station can determine there is MDT information in the terminal in time according to the notification information sent by the second SIM card in the connected state in the terminal, so that the base station can learn in time that the MDT information exists in the terminal, so that the base station can obtain the MDT information in the terminal in time as required.

Figure 6:
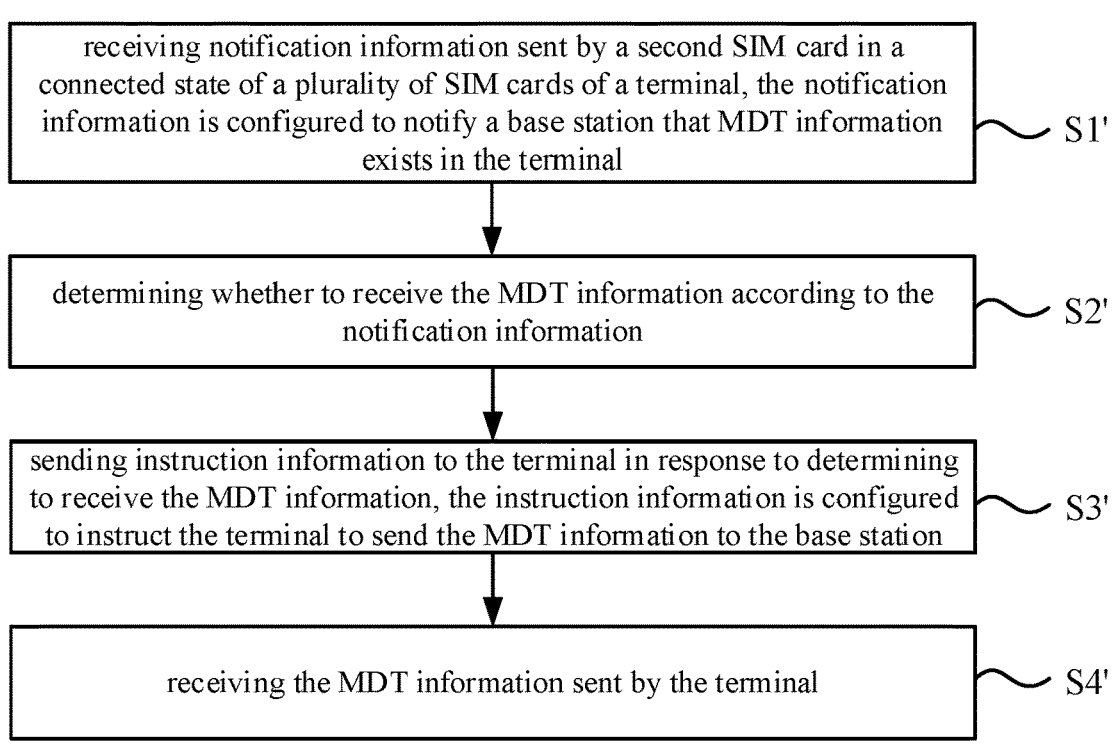
FIG. 6 is a flow chart illustrating a method for receiving MDT information according to an embodiment of the disclosure.

FIG. 6 is a flow chart illustrating a method for receiving MDT information according to an embodiment of the disclosure. The method for receiving MDT information illustrated in embodiments of the disclosure may be suited for a base station. The base station may communicate with a terminal as user equipment. For example, it can communicate with the terminal based on 4G LTE or 5G NR.

The terminal may be based on a multi-card single-standby (for example, dual-card single-standby) mode, or a multi-card multi-standby (for example, dual-card dual-standby) mode, or a multi-card multi-standby multi-pass (for example, dual-card dual-standby dual-pass) mode for communication. The terminal may be provided with a plurality of SIM cards, and may specifically be a USIM, and different SIM cards may correspond to different IMEIs.

As illustrated in FIG. 6, the method for receiving MDT information may include the following S1' to S4'.

At block S1', notification information sent by a second SIM card in a connected state in a plurality of SIM cards of a terminal is received, the notification information is configured to notify a base station that MDT information exists in the terminal.

At block S2', it is determined whether to receive the MDT information according to the notification information.

At block S3', instruction information is sent to the terminal in response to determining to receive the MDT information, the instruction information is configured to instruct the terminal to send the MDT information to the base station.

At block S4', the MDT information sent by the terminal is received.

In an embodiment, the base station can receive notification information sent by the second SIM card in a connected state among the multiple SIM cards of the terminal, and it is determined that there is MDT information in the terminal according to the notification information, thus there is no need for the first SIM card that obtains the MDT information to send the notification information to the terminal.

Accordingly, even when the first SIM card that has obtained the MDT information is in the disconnected state and cannot send the MDT information to the base station or notify the base station that MDT information exists in the terminal, the base station can receive the notification information from the second SIM card in the connected state in the terminal to determine the existence of MDT information in the terminal, so that the base station can learn that the MDT information exists in the terminal in time, so as to obtain the MDT information in the terminal in time as required.

Figure 7:
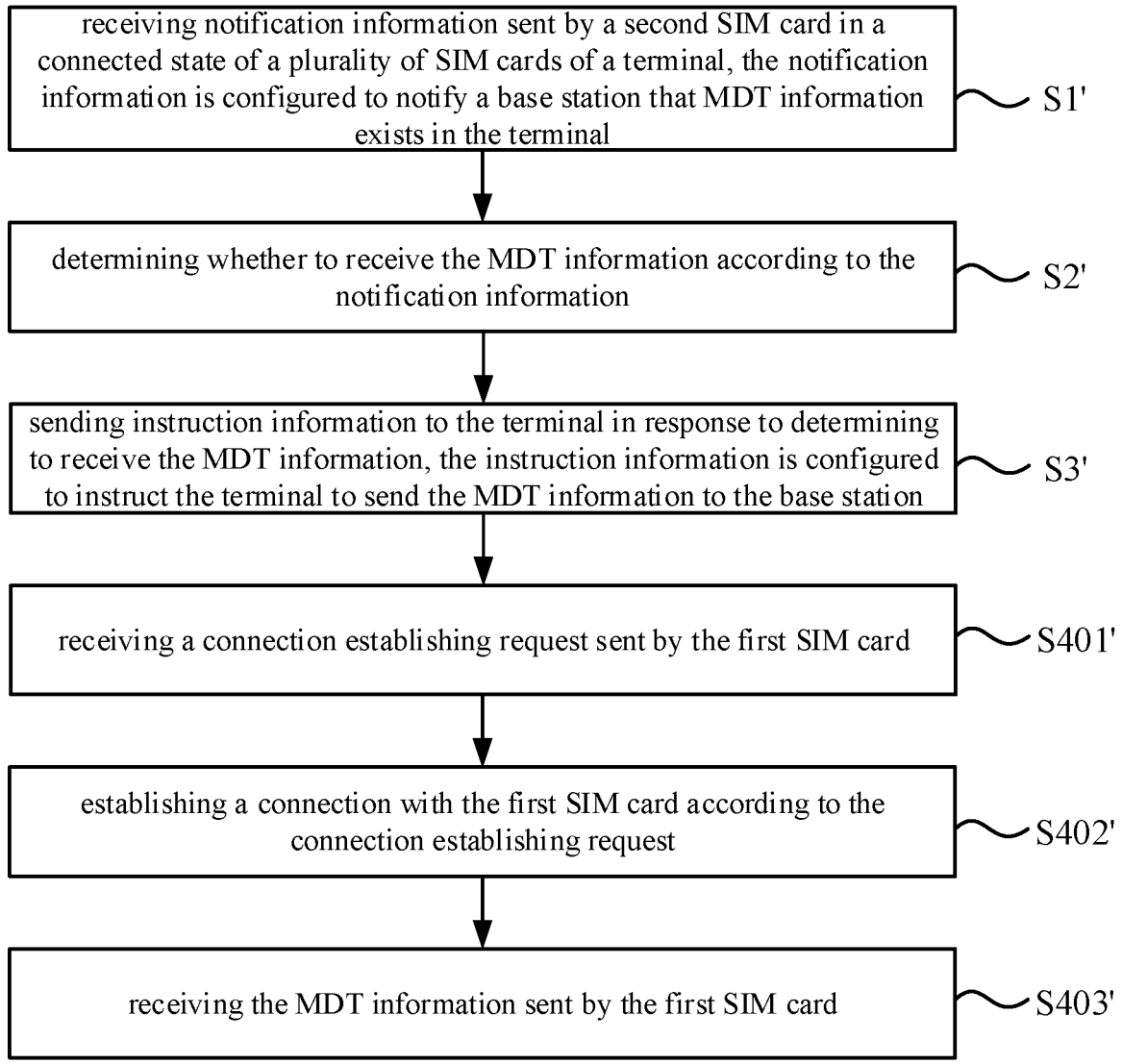
FIG. 7 is a flow chart illustrating a method for receiving MDT information according to another embodiment of the disclosure.

FIG. 7 is a flow chart illustrating a method for receiving MDT information according to another embodiment of the disclosure. As illustrated in FIG. 7, the instruction information includes first instruction information, the first instruction information is configured to instruct a first SIM card in a disconnected state in the plurality of SIM cards of the terminal to send the MDT information to the base station. Receiving the MDT information sent by the terminal includes the following S401' to S403'.

At block S401', a connection establishing request sent by the first SIM card is received.

At block S402', a connection with the first SIM card is established according to the connection establishing request.

At block S403', the MDT information sent by the first SIM card is received.

In an embodiment, when the base station determines to receive the MDT information, it can send the first instruction information to the terminal, so as to instruct, according to the first instruction information, the terminal to send the MDT information to the base station through the first SIM card. After the terminal receives (for example, receives through the second the SIM card) the first instruction information, the terminal may determine that the base station needs to receive the MDT information. The first SIM card in the terminal may send the connection establishing request to the base station, and the base station may establish a connection with the first SIM card according to the connection establishing request, and then receive the MDT information sent by the first SIM card.

Figure 8:
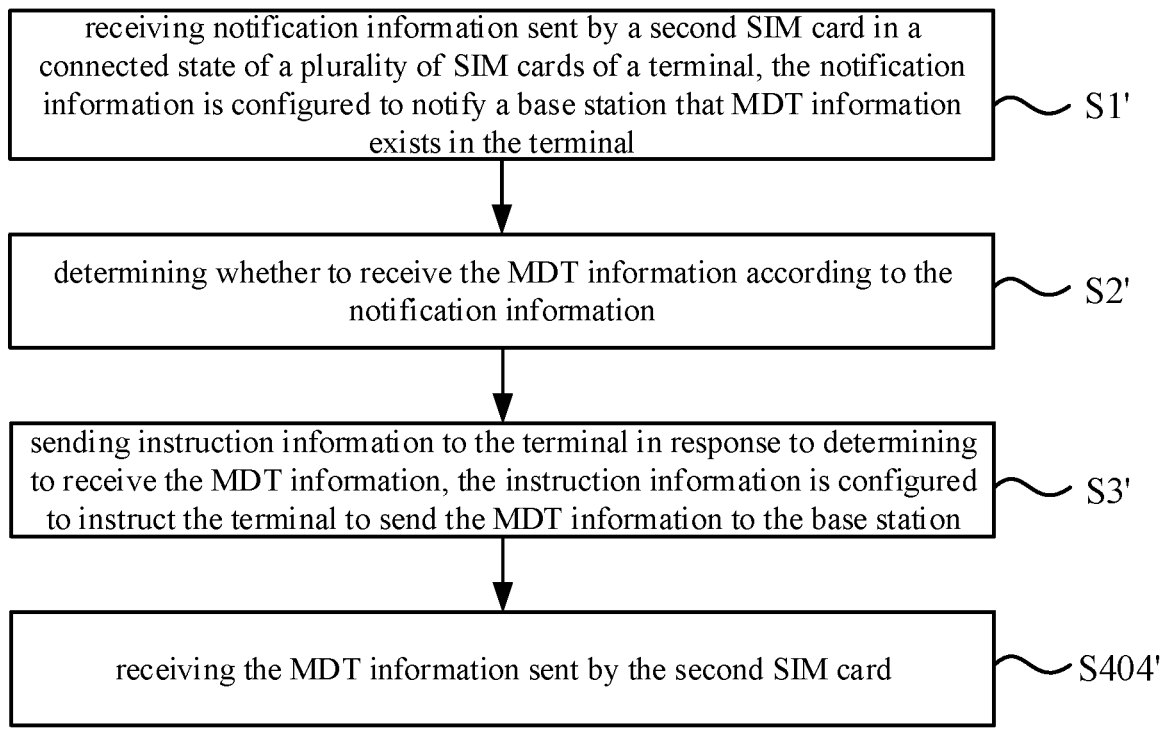
FIG. 8 is a flow chart illustrating a method for receiving MDT information according to yet another embodiment of the disclosure.

FIG. 8 is a flow chart illustrating a method for receiving MDT information according to yet another embodiment of the disclosure. As illustrated in FIG. 8, the instruction information includes second instruction information, the second instruction information is configured to instruct the second SIM card to send the MDT information to the base station. Receiving the MDT information sent by the terminal includes the following S404'.

At block S404', the MDT information sent by the second SIM card is received.

If the base station determines to receive the MDT information, it can send the second instruction information to the terminal, so as to instruct, according to the second instruction information, the terminal to send the MDT information to the base station through the second SIM card. After the terminal receives (for example, receives through the second the SIM card) the second instruction information, the terminal may determine that the base station needs to receive the MDT information. Since the second SIM card in the terminal is in the connected state, the base station may directly receive the MDT information sent by the second SIM card.

Figure 9:
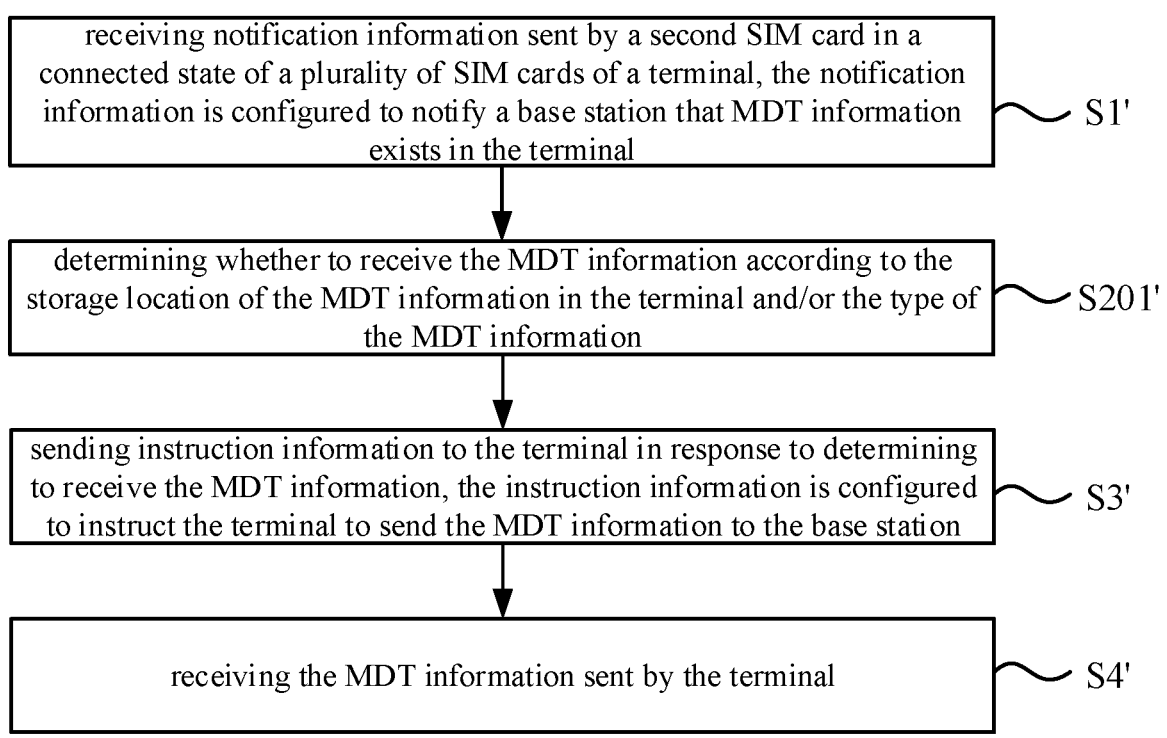
FIG. 9 is a flow chart illustrating a method for receiving MDT information according to yet another embodiment of the disclosure.

FIG. 9 is a flow chart illustrating a method for receiving MDT information according to yet another embodiment of the disclosure. As illustrated in FIG. 9, the notification information is further configured to instruct a storage location of the MDT information in the terminal and/or a type of the MDT information. Determining whether to receive the MDT information according to the notification information includes the following S201'.

At block S201', it is determined whether to receive the MDT information according to the storage location of the MDT information in the terminal and/or the type of the MDT information.

In an embodiment, the first SIM card can carry the type of MDT information in the request information, such as, whether the MDT information is a logged MDT or an immediate MDT. The second SIM card may send the type of MDT information to the base station together in the notification information.

The MDT information may be stored in the first SIM card, and may be transferred into a memory of the terminal after the first SIM card obtains the MDT information. The MDT information may also be carried in the request information by the first SIM card and sent to the second SIM card for storage. Therefore, the storage location of the MDT information in the terminal may be the first SIM card, the second SIM card, or the memory of the terminal.

By sending the storage location of the MDT information in the terminal and the type of the MDT information to the base station, it is convenient for the base station to determine whether to receive the MDT information. For example, the base station can determine whether the type of the MDT information is a target type. If the type of the MDT information is not the target type, the base station does not receive the MDT information. If the type of the MDT information is the target type, the base station receives the MDT information. For example, the base station may determine whether the storage location of the MDT information is a target SIM card. If it is not the target SIM card, the base station does not receive the MDT information. If it is the target SIM card, the base station receives MDT information.

Optionally, the storage location includes one of: the first SIM card, the second SIM card, a memory of the terminal.

Corresponding to the foregoing embodiments of the method for notifying MDT information and the method for receiving MDT information, the disclosure also provides embodiments of an apparatus for notifying MDT information and an apparatus for receiving MDT information.

Figure 10:
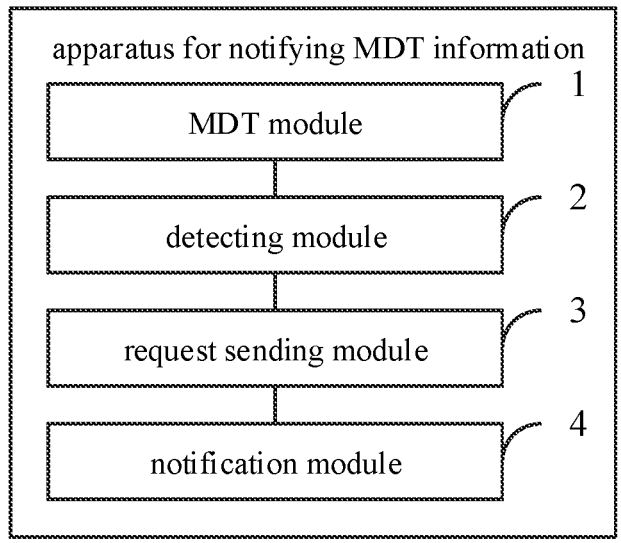
FIG. 10 is a block diagram illustrating an apparatus for notifying MDT information according to an embodiment of the disclosure.

FIG. 10 is a block diagram illustrating an apparatus for notifying MDT information according to an embodiment of the disclosure. The apparatus for notifying MDT information illustrated in embodiments of the disclosure may be suited for a terminal. The terminal may be based on a multi-card single-standby (for example, dual-card single-standby) mode, or a multi-card multi-standby (for example, dual-card dual-standby) mode, or a multi-card multi-standby multi-pass (for example, dual-card dual-standby dual-pass) mode for communication.

The terminal can communicate with a base station as user equipment. For example, it can communicate with the base station based on 4G LTE or 5G NR. The terminal may be provided with a plurality of SIM cards, and may specifically be a USIM, and different SIM cards may correspond to different IMEIs.

As illustrated in FIG. 10, the apparatus for notifying MDT may include an MDT module 1, a detecting module 2, a request sending module 3 and a notification module 4.

The MDT module 1 is configured to perform MDT in a disconnected state through a first SIM card in the plurality of SIM cards to obtain MDT information.

The detecting module 2 is configured to detect whether a second SIM card in a connected state exists in the plurality of SIM cards after the first SIM card obtains the MDT information.

The request sending module 3 is configured to send request information to the second SIM card in response to the second SIM card existing, the request information being configured to request the second SIM card to notify a base station that the MDT information exists in the terminal.

The notification module 4 is configured to send notification information to the base station through the second SIM card, the notification information being configured to notify the base station that the MDT information exists in the terminal.

Optionally, the notification information is further configured to instruct a storage location of the MDT information in the terminal and/or a type of the MDT information.

Optionally, the storage location includes one of: the first SIM card, the second SIM card, a memory of the terminal.

Figure 11:
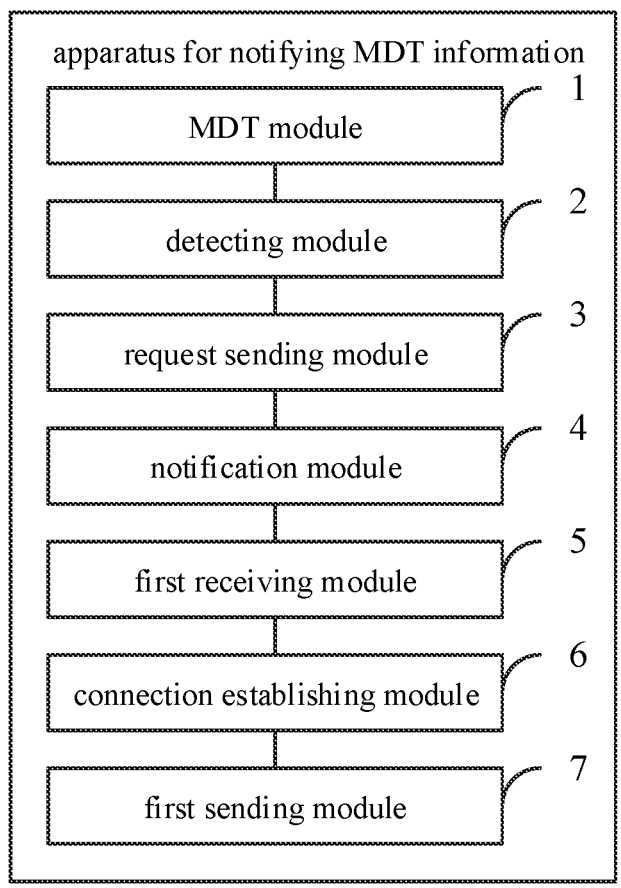
FIG. 11 is a block diagram illustrating an apparatus for notifying MDT information according to another embodiment of the disclosure.

FIG. 11 is a block diagram illustrating an apparatus for notifying MDT information according to another embodiment of the disclosure. As illustrated in FIG. 11, the apparatus further includes a first receiving module 5, a connection establishing module 6 and a first sending module 7.

The first receiving module 5 is configured to receive first instruction information sent by the base station, the first instruction information being configured to instruct the first SIM card to send the MDT information to the base station.

The connection establishing module 6 is configured to send a connection establishing request to the base station through the first SIM card.

The first sending module 7 is configured to send the MDT information to the base station through the first SIM card after the first SIM card establishes a connection with the base station.

Figure 12:
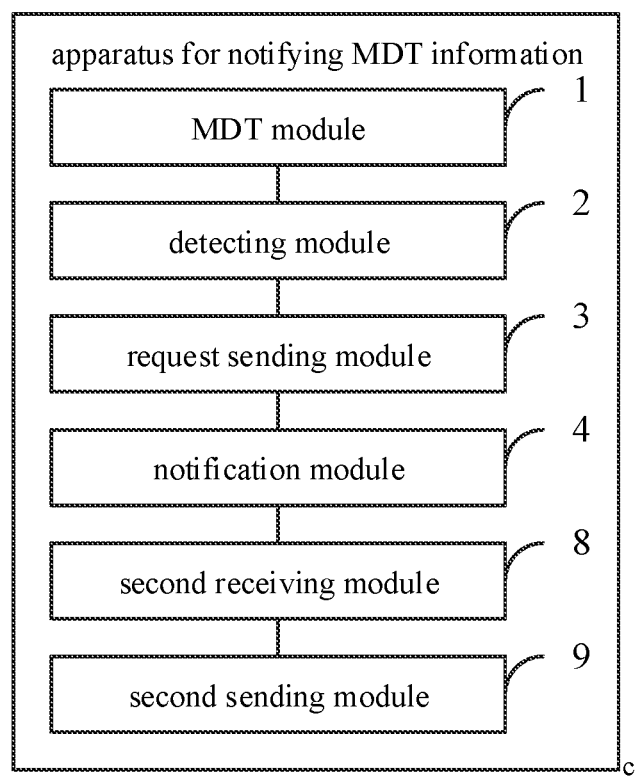
FIG. 12 is a block diagram illustrating an apparatus for notifying MDT information according to yet another embodiment of the disclosure.

FIG. 12 is a block diagram illustrating an apparatus for notifying MDT information according to yet another embodiment of the disclosure. As illustrated in FIG. 12, the apparatus further includes a second receiving module 8 and a second sending module 9.

The second receiving module 8 is configured to receive second instruction information sent by the base station, the second instruction information being configured to instruct the second SIM card to send the MDT information to the base station.

The second sending module 9 is configured to send the MDT information to the base station through the second SIM card.

Figure 13:
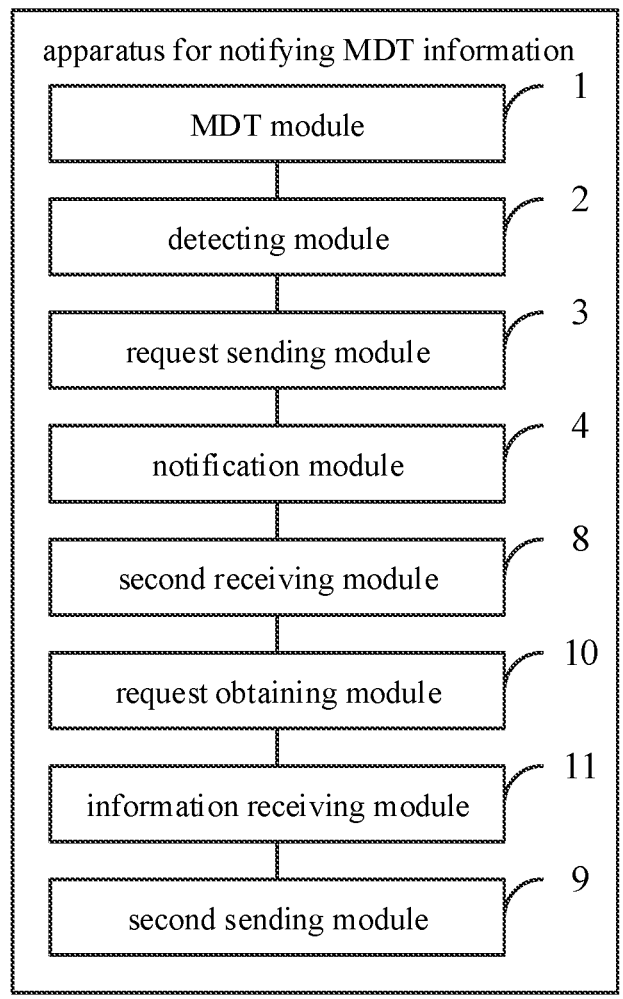
FIG. 13 is a block diagram illustrating an apparatus for notifying MDT information according to yet another embodiment of the disclosure.

FIG. 13 is a block diagram illustrating an apparatus for notifying MDT information according to yet another embodiment of the disclosure. As illustrated in FIG. 13, the apparatus further includes a request obtaining module 10 and an information receiving module 11.

The request obtaining module 10 is configured to send a request for obtaining the MDT information to the first SIM card through the second SIM card.

The information receiving module 11 is configured to receive the MDT information sent by the first SIM card through the second SIM card.

Optionally, the request information carries the MDT information.

Optionally, the disconnected state is an idle state or an inactive state.

Optionally, the request sending module 3 is configured to send the request information to the second SIM card through the first SIM card.

Optionally, the request sending module 3 is configured to send the request information to the second SIM card through the terminal.

Optionally, the detecting module is further configured to, in response to the second SIM card not existing, detect whether the second SIM card exists periodically before the first SIM card enters the connected state.

Figure 14:
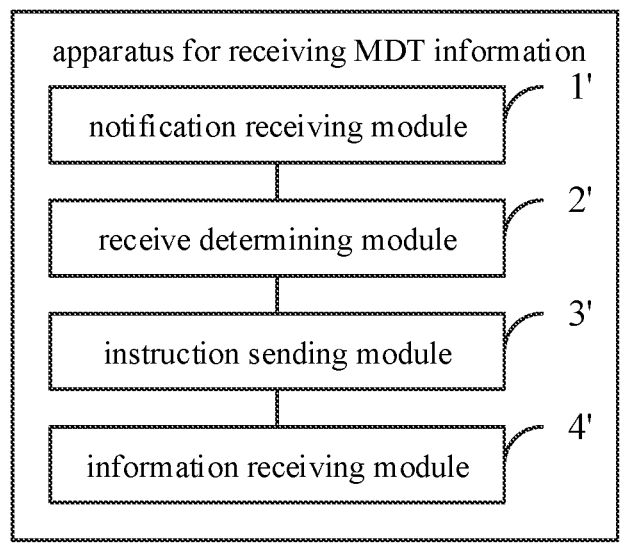
FIG. 14 is a block diagram illustrating an apparatus for receiving MDT information according to an embodiment of the disclosure.

FIG. 14 is a block diagram illustrating an apparatus for receiving MDT information according to an embodiment of the disclosure. The apparatus for receiving MDT information illustrated in embodiments of the disclosure may be suited for a base station. The base station may communicate with a terminal as user equipment. For example, it can communicate with the terminal based on 4G LTE or 5G NR.

The terminal may be based on a multi-card single-standby (for example, dual-card single-standby) mode, or a multi-card multi-standby (for example, dual-card dual-standby) mode, or a multi-card multi-standby multi-pass (for example, dual-card dual-standby dual-pass) mode for communication. The terminal may be provided with a plurality of SIM cards, and may specifically be a USIM, and different SIM cards may correspond to different IMEIs.

As illustrated in FIG. 14, the apparatus for receiving MDT information may include a notification receiving module 1', a receive determining module 2', an instruction sending module 3' and an information receiving module 4'.

The notification receiving module 1' is configured to receive notification information sent by a second SIM card in a connected state in a plurality of SIM cards of a terminal, the notification information being configured to notify a base station that MDT information exists in the terminal.

The receive determining module 2' is configured to determine whether to receive the MDT information according to the notification information.

The instruction sending module 3' is configured to send instruction information to the terminal in response to determining to receive the MDT information, the instruction information being configured to instruct the terminal to send the MDT information to the base station;

The information receiving module 4' is configured to receive the MDT information sent by the terminal.

Figure 15:
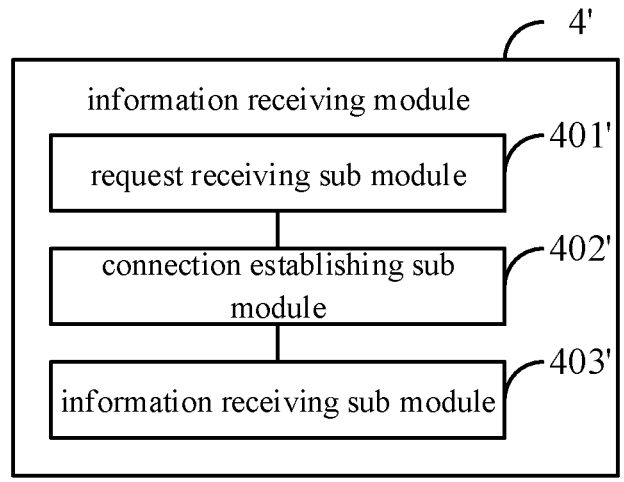
FIG. 15 is a block diagram illustrating an information receiving module according to an embodiment of the disclosure.

FIG. 15 is a block diagram illustrating an information receiving module according to an embodiment of the disclosure. As illustrated in FIG. 15, the instruction information includes first instruction information. The first instruction information is configured to instruct a first SIM card in a disconnected state in the plurality of SIM cards of the terminal to send the MDT information to the base station. The information receiving module includes a request receiving sub module 401', a connection establishing sub module 402' and an information receiving sub module 403'.

The request receiving sub module 401' is configured to receive a connection establishing request sent through the first SIM card.

The connection establishing sub module 402' is configured to establish a connection with the first SIM card according to the connection establishing request.

The information receiving sub module 403' is configured to receive the MDT information sent by the first SIM card.

Optionally, the instruction information includes second instruction information, the second instruction information is configured to instruct the second SIM card to send the MDT information to the base station. The information receiving module is configured to receive the MDT information sent by the second SIM card.

Optionally, the notification information is further configured to instruct a storage location of the MDT information in the terminal and/or a type of the MDT information. The receive determining module is configured to determine whether to receive the MDT information according to the storage location of the MDT information in the terminal and/or the type of the MDT information.

Optionally, the storage location includes one of: the first SIM card, the second SIM card, a memory of the terminal.

Regarding the apparatus in the above-mentioned embodiments, the specific manner in which each module performs operations has been described in detail in the embodiments of the related method, and will not be described in detail here.

As for the apparatus embodiments, since they basically correspond to the method embodiments, reference may be made to the partial descriptions of the method embodiments for relevant parts. The apparatus embodiments described above are only illustrative, in which the modules described as separate components may or may not be physically separated, and the components displayed as modules may or may not be physical modules, that is, they may be located in one place, or they may be distributed over multiple network modules. Some or all of the modules may be selected according to actual needs to achieve the purpose of the solution of this embodiment. Those skilled in the art can understand and implement it without creative effort.

Embodiments of the disclosure further provide an electronic device. The electronic device includes: a processor; and a memory configured to store instruction executable by the processor. The processor is configured to implement the method for notifying MDT information according to any of the above embodiments.

Embodiments of the disclosure further provide an electronic device. The electronic device includes: a processor; and a memory configured to store instruction executable by the processor. in any of claims 1 to 3 for receiving MDT information according to any of the above embodiments.

Embodiments of the disclosure further provide a computer-readable storage medium having stored thereon a computer program. Steps of the method for notifying MDT information according to any of the above embodiments is implemented when the program is executed by a processor.

Embodiments of the disclosure further provide a computer-readable storage medium having stored thereon a computer program. Steps of the method for receiving MDT information according to any of the above embodiments is implemented when the program is executed by a processor.

Figure 16:
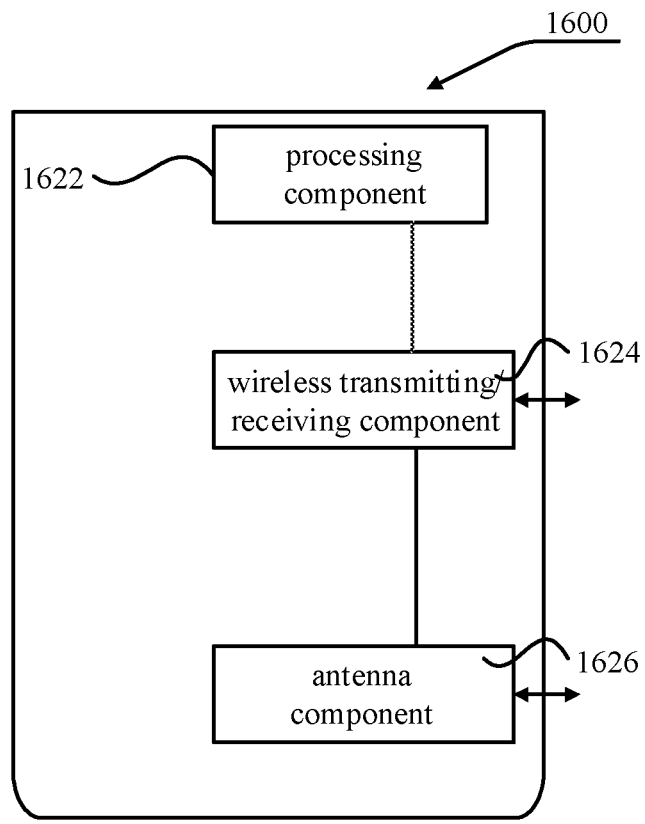
FIG. 16 is a schematic diagram illustrating an apparatus for notifying MDT information according to an embodiment of the disclosure.

As illustrated in FIG. 16, FIG. 16 is a schematic diagram illustrating an apparatus 1600 for notifying MDT information according to an embodiment of the disclosure. The apparatus 1600 may be provided as a base station. As illustrated in FIG. 16, the apparatus 1600 includes a processing component 1622, a wireless transmitting/receiving component 1624, an antenna component 1626, and a signal processing portion specific to a wireless interface. The processing component 1622 may further include one or more processors. One processor in the processing component 1622 may be configured to implement the method for receiving MDT information described in any of the above embodiments.

Figure 17:
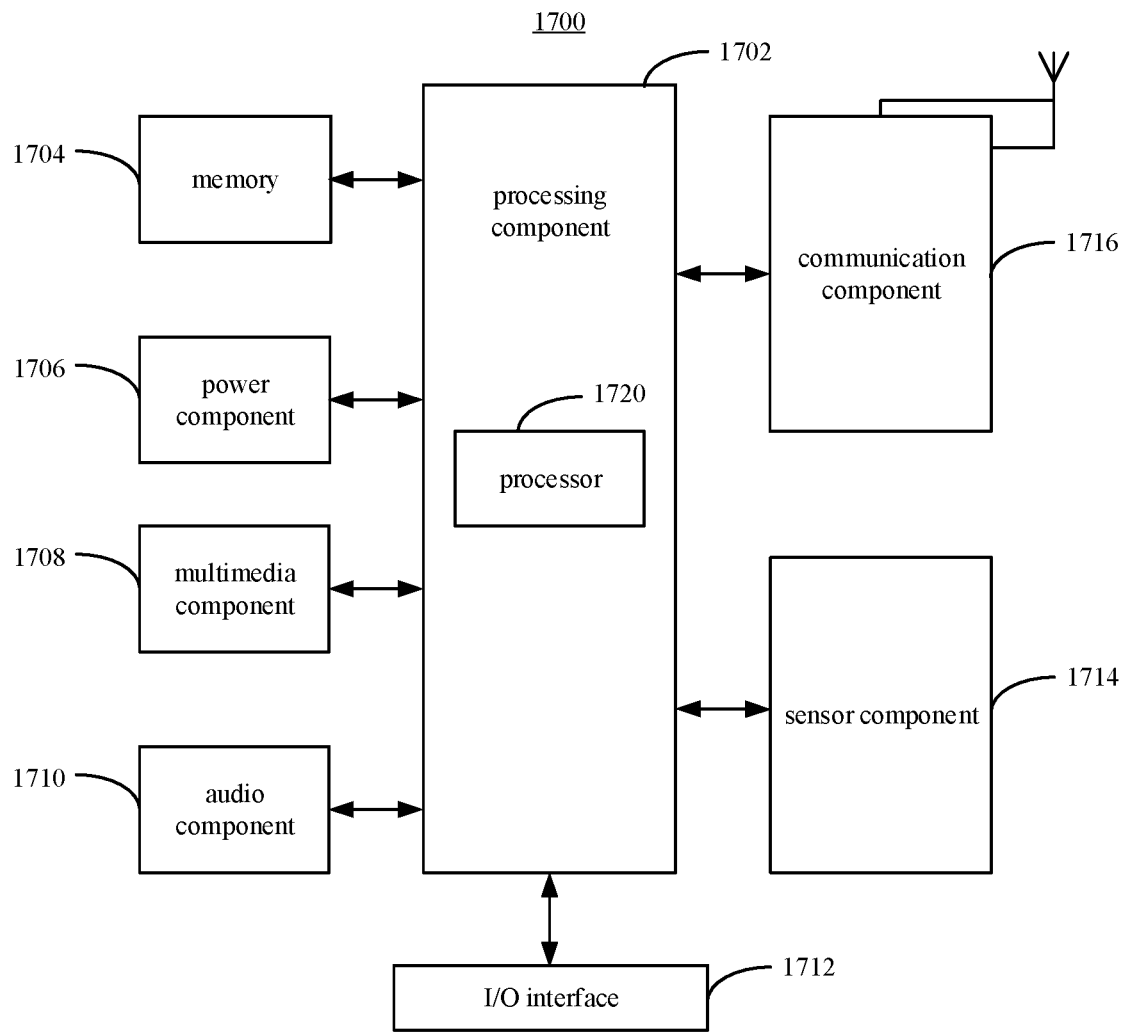
FIG. 17 is a schematic diagram illustrating an apparatus for receiving MDT information according to an embodiment of the disclosure.

FIG. 17 is a schematic diagram illustrating an apparatus 1700 for receiving MDT information according to an embodiment of the disclosure. For example, the apparatus 1700 may be a mobile phone, a computer, a digital broadcast terminal, a messaging device, a gaming console, a tablet, a medical device, exercise equipment, a personal digital assistant, and the like.

As illustrated in FIG. 17, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the apparatus 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the apparatus 1700. Examples of such data include instructions for any applications or methods operated on the apparatus 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the apparatus 1700. The power component 1706 may include a power management system, one or more power sources, and any other components associated with the generation, management, and distribution of power in the apparatus 1700.

The multimedia component 1708 includes a screen providing an output interface between the apparatus 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the apparatus 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the apparatus 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the apparatus 1700. For instance, the sensor component 1714 may detect an open/closed status of the apparatus 1700, relative positioning of components, e.g., the display and the keypad, of the apparatus 1700, a change in position of the apparatus 1700 or a component of the apparatus 1700, a presence or absence of user contact with the apparatus 1700, an orientation or an acceleration/deceleration of the apparatus 1700, and a change in temperature of the apparatus 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the apparatus 1700 and other devices. The apparatus 1700 can access a wireless network based on a communication standard, such as Wi-Fi, 2G, or 3G, 4G LET, 5G NR or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1704, executable by the processor 1720 in the apparatus 1700, for performing the above-described methods. For example, the non-transitory computer-readable storage medium may be a ROM, a random access memory (SAM), a CD-ROM, a magnetic tape, a floppy disc, an optical data storage device, and the like.

Other implementations of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the present disclosure is limited only by the appended claims.

It should be noted that, in this description, relational terms such as first and second, etc. are only used to distinguish one entity or operation from another entity or operation, and do not necessarily require or imply any such actual relationship or sequence between these entities or operations. The terms "comprising", "containing" or any other variation thereof are intended to encompass non-exclusive inclusion such that a process, method, article or apparatus comprising a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

The methods and apparatus provided by the embodiments of the disclosure are described in detail above, and specific examples are used herein to illustrate the principles and implementations of the disclosure. The descriptions of the above embodiments are only used to help understand the method of the disclosure and its core idea; at the same time, for those skilled in the art, according to the idea of the disclosure, there will be changes in the specific implementation and application scope. In summary, the content of this specification should not be construed as a limitation of the present disclosure.

What is claimed is:

1. A method for notifying MDT (minimization of drive tests) information, performed by a terminal with a plurality of SIM (subscriber identity module) cards, the method comprising:
    performing MDT in a disconnected state by a first SIM card of the plurality of SIM cards to obtain MDT information;
    detecting, after the first SIM card obtains the MDT information, whether a second SIM card of the plurality of SIM cards being in a connected state;
    in response to a second SIM card being in a connected state, sending request information to the second SIM card, wherein, the request information is configured to request the second SIM card to notify a base station that the MDT information exists in the terminal; and
    sending, by the second SIM card, notification information to the base station, wherein the notification information is configured to notify the base station that the MDT information exists in the terminal.

2. The method as claimed in claim 1, wherein the notification information is further configured to instruct a storage location of the MDT information in the terminal and/or a type of the MDT information.

3. The method as claimed in claim 2, wherein the storage location comprises one of:
    the first SIM card, the second SIM card, a memory of the terminal.

4. The method as claimed in claim 1, further comprising:
    receiving first instruction information sent by the base station, wherein the first instruction information is configured to instruct the first SIM card to send the MDT information to the base station;
    sending, by the first SIM card, a connection establishing request to the base station; and
    sending, by the first SIM card, the MDT information to the base station after the first SIM card establishes a connection with the base station.

5. The method as claimed in claim 1, further comprising:
    receiving second instruction information sent by the base station, wherein the second instruction information is configured to instruct the second SIM card to send the MDT information to the base station; and
    sending, by the second SIM card, the MDT information to the base station.

6. The method as claimed in claim 5, before the second SIM card sends the MDT information to the base station, further comprising:
    sending, by the second SIM card, a request for obtaining the MDT information to the first SIM card; and
    receiving, by the second SIM card, the MDT information sent by the first SIM card.

7. The method as claimed in claim 5, wherein the request information carries the MDT information.

8. The method as claimed in claim 1, wherein sending the request information to the second SIM card comprises:

sending the request information to the second SIM card by the first SIM card.

9. The method as claimed in claim 1, wherein sending the request information to the second SIM card comprises:
sending the request information to the second SIM card by the terminal.

10. The method as claimed in claim 1, further comprising:
in response to all the plurality of SIM cards being not in a connected state, detecting, before the first SIM card enters the connected state, whether a second SIM card of the plurality of SIM cards being in a connected state periodically.

11. A method for receiving MDT information, performed by a base station, the method comprising:
receiving notification information sent by a second SIM card in a connected state of a plurality of SIM cards of a terminal, wherein the notification information is configured to notify a base station that MDT information exists in the terminal;
determining whether to receive the MDT information according to the notification information;
sending instruction information to the terminal in response to determining to receive the MDT information, wherein the instruction information is configured to instruct the terminal to send the MDT information to the base station; and
receiving the MDT information sent by the terminal.

12. The method as claimed in claim 11, wherein the instruction information comprises first instruction information, the first instruction information is configured to instruct a first SIM card in a disconnected state of the plurality of SIM cards of the terminal to send the MDT information to the base station, wherein receiving the MDT information sent by the terminal comprises:
receiving a connection establishing request sent by the first SIM card;
establishing a connection with the first SIM card according to the connection establishing request; and
receiving the MDT information sent by the first SIM card.

13. The method as claimed in claim 11, wherein the instruction information comprises second instruction information, the second instruction information is configured to instruct the second SIM card to send the MDT information to the base station, wherein receiving the MDT information sent by the terminal comprises:
receiving the MDT information sent by the second SIM card.

14. The method as claimed in claim 1, wherein the notification information is further configured to instruct a storage location of the MDT information in the terminal and/or a type of the MDT information, determining whether to receive the MDT information according to the notification information comprises:
determining whether to receive the MDT information according to the storage location of the MDT information in the terminal and/or the type of the MDT information.

15. The method as claimed in claim 14, wherein the storage location comprises one of:
the first SIM card, the second SIM card, a memory of the terminal.

16. An electronic device, comprising:
a processor; and
a memory configured to store instruction executable by the processor;
wherein the processor is configured to implement the method for receiving MDT information as claimed in claim 1.

17. An electronic device, wherein the electronic device being a terminal with a plurality of SIM (subscriber identity module) cards, the electronic device comprising:
a processor; and
a memory configured to store instruction executable by the processor;
wherein the processor is configured to implement a method for notifying MDT information, the method comprising:
performing MDT in a disconnected state by a first SIM card of the plurality of SIM cards to obtain MDT information;
detecting, after the first SIM card obtains the MDT information, whether a second SIM card of the plurality of SIM cards being in a connected state;
in response to a second SIM card being in a connected state, sending request information to the second SIM card, wherein, the request information is configured to request the second SIM card to notify a base station that the MDT information exists in the terminal; and
sending, by the second SIM card, notification information to the base station, wherein the notification information is configured to notify the base station that the MDT information exists in the terminal.

* * * * *